US008578258B2

(12) United States Patent
Fey et al.

(10) Patent No.: US 8,578,258 B2
(45) Date of Patent: Nov. 5, 2013

(54) METHOD AND INTEGRATED CIRCUIT FOR INCREASING THE IMMUNITY TO INTERFERENCE

(75) Inventors: Wolfgang Fey, Niederhausen (DE); Micha Heinz, Darmstadt (DE); Adrian Traskov, Steinbach (DE); Frank Michel, Rosbach v.d. Höhe (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 1255 days.

(21) Appl. No.: 10/590,087

(22) PCT Filed: Feb. 17, 2005

(86) PCT No.: PCT/EP2005/050707
§ 371 (c)(1),
(2), (4) Date: Aug. 21, 2006

(87) PCT Pub. No.: WO2005/081107
PCT Pub. Date: Sep. 1, 2005

(65) Prior Publication Data
US 2007/0205930 A1 Sep. 6, 2007

(30) Foreign Application Priority Data

Feb. 20, 2004 (DE) .......................... 10 2004 008 809

(51) Int. Cl.
*G06F 11/00* (2006.01)
(52) U.S. Cl.
USPC .......................................................... 714/815
(58) Field of Classification Search
USPC .......................................................... 714/815
See application file for complete search history.

(56) References Cited

U.S. PATENT DOCUMENTS

| 5,333,301 | A | * | 7/1994 | Cheney et al. | 714/56 |
| 5,463,631 | A | | 10/1995 | Yamamoto et al. | |
| 5,488,872 | A | * | 2/1996 | McCormick | 73/862.68 |
| 5,522,040 | A | * | 5/1996 | Hofsass et al. | 714/55 |
| 6,012,156 | A | * | 1/2000 | Zydek et al. | 714/736 |
| 6,044,068 | A | * | 3/2000 | El Malki | 370/286 |
| 6,194,914 | B1 | * | 2/2001 | Sako | 326/113 |
| 6,449,630 | B1 | * | 9/2002 | Bao | 708/603 |
| 6,529,046 | B1 | | 3/2003 | Shih | |

(Continued)

FOREIGN PATENT DOCUMENTS

EP          0 841 750          5/1998

*Primary Examiner* — Albert Decady
*Assistant Examiner* — Enam Ahmed

(57) ABSTRACT

Disclosed is a method of improving the immunity to interference of an integrated circuit (16) having error signals transferred between a microprocessor chip or multiple processor μC (1) and an additional component (2). For the transfer, a minimum pulse length that is independent of the clock frequency of the microprocessor or the microprocessors is defined, starting from which a signal on an error line having a defined pulse length is interpreted as an error. Also disclosed is an integrated circuit, which is designed so that the above method is implemented. The circuit has a microprocessor chip or multiple processor microcontroller (1) or microprocessor module and an additional component (2) having separately arranged power elements. The circuit also has pulse extending devices and/or signal delaying devices for the output of error pulses (6, 6') one after the other through at least one error line (3, 4).

22 Claims, 3 Drawing Sheets

(56) References Cited

U.S. PATENT DOCUMENTS

| | | |
|---|---|---|
| 6,658,606 B1 | 12/2003 | Link et al. |
| 7,092,827 B2 * | 8/2006 | Kumar et al. ............... 702/57 |
| 7,873,785 B2 * | 1/2011 | Olukotun .................. 711/118 |
| 2006/0052962 A1 * | 3/2006 | Shipton et al. ............. 702/106 |
| 2011/0102258 A1 * | 5/2011 | Underbrink et al. ..... 342/357.47 |
| 2011/0200048 A1 * | 8/2011 | Thi et al. .................. 370/392 |

* cited by examiner

METHOD AND INTEGRATED CIRCUIT FOR INCREASING THE IMMUNITY TO INTERFERENCE

This application is the U.S. national phase of international application PCT/EP05/507077 filed Feb. 17, 2005, which designated the U.S. and which claims the benefit of priority of German Patent Application Number. 10 2004 008 809.8 filed Feb. 20, 2004. The contents of each of the aforementioned documents are incorporated herein in their entirety.

BACKGROUND OF THE INVENTION

The present invention relates to integrated circuits, in particular in electronic control units, being preferably components of motor vehicle control units. In particular, the control units concern control units for motor vehicle brake systems. Control units of this type are, among others, appropriate for performing safety-critical control operations. The motor vehicle control units preferably comprise control programs such as ABS, TCS, ESP, and similar systems. Due to the high safety requirements, the control systems formed of the integrated circuits comprise safety circuits, which help detecting failure or a defect and initiate appropriate measures such as deactivation of the overall system or an emergency operation due to measures that partly preserve the operation of the controlled system.

Control systems with integrated circuits comprising microprocessors are generally known for the above-mentioned tasks. To prevent malfunctions or to detect them, it is suitable to arrange for at least two processor cores. Admittedly, three or more processor cores would increase safety even further, however, this is not always desired for cost reasons in connection with the large scale manufacture being customary in the field of motor vehicle technology. Therefore, there is a demand for low-cost circuits with a high safety level.

For example, a concept of a control system, which is composed of two integrated circuits accommodated in separate chip housings, has stood the test. This concept achieves the advantage of a spatial separation of power elements (Power FETs etc.) and highly integrated microprocessor components µC, memories, etc.).

The error-relevant communication favorably takes place by way of two error lines ERR and ERR_N in the above example.

The invention is based on a system as mentioned above and improves it in order to further improve the immunity to interference.

According to the invention, this object is achieved by a method of improving the immunity to interference of an integrated circuit (16), wherein error signals are transferred between at least one microprocessor chip or multiple processor µC (1) and at least one further component (2) in the form of one or more error signals. In the transfer, a minimum pulse length that is independent of the clock frequency of the microprocessor or the microprocessors is defined, starting from which a signal on an error line having a defined pulse length is interpreted as an error. The invention is also achieved by an integrated circuit including at least one microprocessor chip or multiple processor microcontroller (1) or microprocessor module and at least one additional separate component (2) or a mixed-signal module integrated in the same component and comprising in particular separately arranged power elements, and one or more pulse extending devices and/or signal delaying devices for the output of error pulses (6, 6') one after the other through at least one error line (3, 4).

Further, the control system can possess one or more monitoring circuits, which are incorporated in particular on one or more additional separate chips (watchdog).

In the prior art electronic controller, processor chip and power chip are advantageously interconnected by way of the lines ERR and ERR_N. In this arrangement, the power chip must be able to detect pulses of the processor chip, which are transmitted on ERR or ERR_N, respectively, with a minimum pulse width of e.g. $T_{min}$=30 nanoseconds. It is possible that external electrostatic, magnetic, or electromagnetic interferences (e.g. frictional electricity, ESD) intervene into the system and have undesirable effects.

According to the invention, methods as well as integrated circuits are described in order to enhance the immunity to interference, especially the immunity to interference of the signals ERR and ERR_N. This brings about better system availability.

SUMMARY OF THE INVENTION

Following a basic idea of the invention, the following measures are taken in particular, either separately or in any combination desired:

Considerable extension of the minimum pulse width $T_{Min}$
Filtering of the signals ERR and ERR_N in the power chip
New definition of the watchdog time window in the power chip with the introduction of the delay time $T_{WindowDelay}$.
Introduction of the block 'toggle and delay' in the processor chip in order to safeguard the minimum pulse width $T_{Min}$.

The following advantages are hereby achieved:

Filtering the power chip input signals ERR and ERR_N allows improving the system's immunity to interference to a major degree. Especially the influence of electrostatic, magnetic, or electromagnetic interferences is considerably reduced because these interferences are usually of a short duration and, on account of the new, larger minimum pulse length, cannot be interpreted erroneously as error signals.

The method of the invention achieves that the power chip will not cause any restriction in the error monitoring of the processor chip compared to the previous, unfiltered solution. This means, error pulses will not get lost.

The integrated circuit comprises at least one microprocessor chip or multi-processor microcontroller and at least one further component, which is more particularly an integrated component. The integrated component preferably comprises power elements and therefore is a mixed-signal component in particular.

Problems are encountered due to the generally considerably higher clock frequency of the microprocessor components compared to the mixed-signal components. As a result, consecutive error events can follow each other so closely that they can no longer be easily distinguished from other interferences.

Alternatively, the invention can be implemented especially in the following manner:

Digital filtering can be replaced by analog filtering.
When the microcontroller (processor chip) works much more slowly than the mixed-signal chip (power chip), a digital filtering operation can be performed without the 'toggle & delay' block in the microcontroller.

Further preferred embodiments can be seen in the following description of the Figures.

Hereinbelow the invention will be explained in detail by way of examples.

DETAILED DESCRIPTION OF THE DRAWINGS

Figure 1:
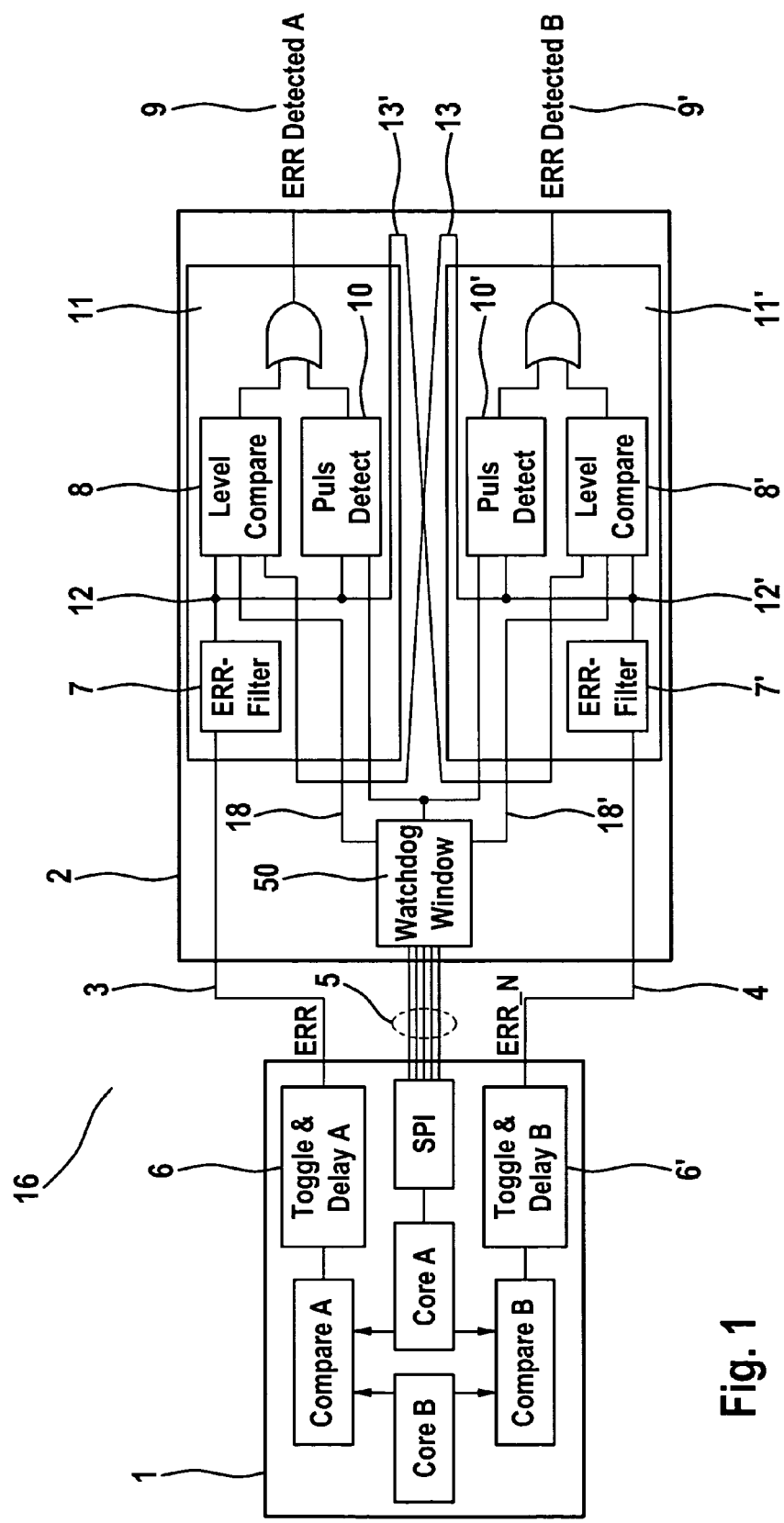
FIG. 1 is a system overview of the interconnected chips.

FIG. 1 depicts a system overview.

In the electronic controller of a motor vehicle brake system, the microcontroller 1 (processor chip) is connected to the mixed-signal-IC 2 (power chip) by way of the error lines 3 and 4 as well as by way of the SPI-interface 5.

The microcontroller 1 comprises two independent processor cores (core A and core B), the operations of which are continuously checked in terms of their hardware by the comparison blocks Compare A and Compare B. When an error is detected in this comparing operation, this error information must be reliably transmitted to power chip 2 through the lines 3 ERR and 4 ERR_N.

According to the method, an error is favorably signaled because the level changes on an error line (e.g. from logical 'High' to 'Low').

It is provided in particular, that each of the lines 3 ERR and 4 ERR_N changes the signal level one time with each error. The levels on ERR and ERR_N are preferably opposed or complementary.

The mixed signal IC 2 generally and preferably works at a considerably slower rate than the microcontroller. It must be ensured for this reason that the pulse width does not fall under the minimum pulse width $T_{min}$ on the signal lines ERR and ERR_N. Otherwise, it is possible that component 2 'fails to notice' an error.

These two tasks are complied with in the blocks 'toggle & delay' 6 and 6'. If several errors prevail in the processor chip, the changes of levels on ERR and ERR_N are delayed ('delay'), in order to guarantee the minimum pulse width $T_{min}$.

The mixed signal IC filters in each case the ERR/ERR_N signals with respectively one filtering device 7, 7'. This filtering operation takes place digitally, in particular. In a preferred manner, a filter time constant $T_{Filter}$ is provided. The minimum pulse width $T_{min}$ is advantageously much longer than the internal system clock of the power chip 2.

Filtering the signals ERR/ERR_N advantageously allows suppressing external interferences (electrostatic, magnetic, or electromagnetic interferences), whereby the reliability and availability of the system is increased.

It is checked redundantly in the blocks 'level compare' 8, 8' whether both error signals have opposed levels. Identical levels on ERR and ERR_N lead to an error and, further, are output outside a testing routine on the signals 'error detected' 9, 9'. In addition, the block 'pulse detect' 10, 10' searches for edges on the filtered ERR/ERR_N signals. The signal outputs of block 'level-compare' 8 and 'pulse-detect' 10 are logically operated by an OR-element and form the output 'ERR detected A' 9. The same applies to the redundant path 11'.

In the electronic controller of the example, a watchdog testing routine with an artificial error transfer over the SPI interface 5 from processor chip 1 to power chip 2 is signaled in regular intervals $T_{Loop}$. The error detection in the microcontroller and the connections between power chip and processor chip through the error lines are tested during this testing routine. Using test structures actuated by software, an error is produced in the microcontroller and causes a one-time change in levels on the ERR/ERRN lines at the output of the blocks 'toggle and delay'.

While the testing routine ('watchdog transfer') is active, power chip 1 defines via bus 5 a time window in block 50. Within the time window, in particular a signal is considered a valid error signal for testing, which is composed of exactly one change of edge on the filtered ERR and the ERR_N-line. An error is detected by the block 'pulse detect' 10 (or 10' in the redundant branch B), when no edge or more than one edge appears on the filtered signals of ERR-filter or ERR_N-filter within the time window (see timing diagram in FIG. 2). Level monitoring 8 is disabled during the watchdog transfer by means of line 18 (18' in the redundant branch B), because the change of levels on ERR and ERR_N cannot be absolutely synchronous due to different signal running times.

At the end of the time window defined by block 50, the signals ERR/ERR_N must have opposed levels again because now the level monitoring operation of the filtered signals re-commences.

If there occurs a change in level on the filtered signals ERR or ERR_N outside the watchdog time window, this condition is detected directly as an error by block 'pulse detect' 10 and output on line 'ERR detected' 9. In order to achieve this mode of function, block 50 connects to block 10 by way of a control line.

Block 'level-compare' 8 is also provided redundantly (see block 8'). A check is made in block 8 whether the error signals of the complementary error lines are both provided. In the negative, e.g. if one of the error lines is defective, an error is output.

Figure 2:
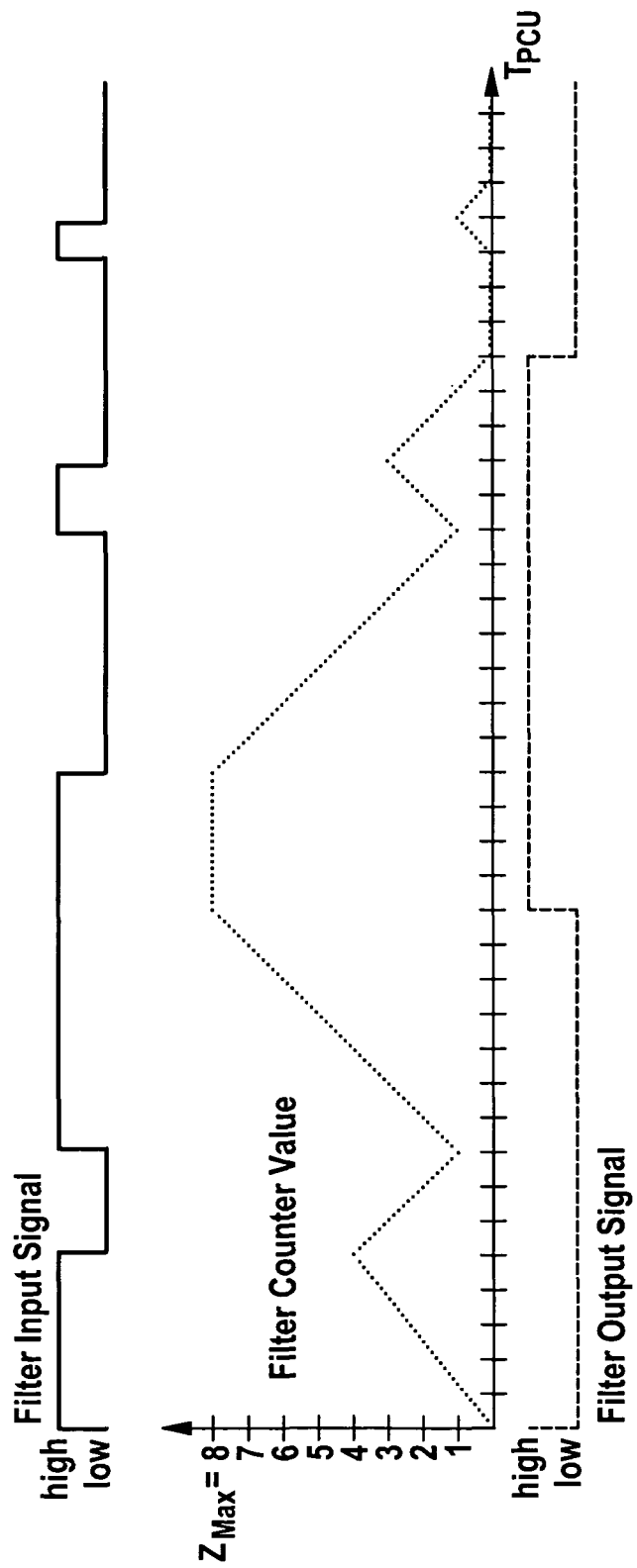
FIG. 2 is an illustration of the filtering characteristics in connection with the error lines.

FIG. 2 indicates how an implementation of the ERR-filters 7 or 7', respectively, can take place:

As can be seen in FIG. 1, the error detection for the lines 3 ERR and 4 ERR_N principally has a redundant design in power chip 2. Therefore, each processor core is favorably provided with its own error detection circuit 11 and 11' with a respective own error line 9 'ERR-detected A' and 9 'err-detected B'. Advantageously, the filter 7 in circuit 11 is provided only for one of the existing error lines 3 and 4 for the purpose of reducing the costs of manufacture. There is likewise only one filtering circuit 7' in circuit 11'. In both circuits 11 and 11', the output of the filter 7 or 7', respectively, with the connecting points 12 and 12' is led via cross lines 13 and 13' to the inputs of the 'level-compare' circuits 8 and 8' beside the error signals 3 and 4 on the inlet side. To this end, the result of the filtering operation is hence respectively fed back into the block ERR-check B 11'. In the reverse case, the same applies to the ERR_N filter, the result of which is fed back into the block ERR-check A 11. The feedback operation is used in each case for the test in terms of inverted levels.

ERR-filter 7 is preferably designed as a digital forward/backward counter, which changes its count depending on the input signals. If a signal with the digital low-level prevails at the input of the filter, the count is reduced by one. If a high-level prevails, the count is increased by one. The possible counts of the counter are limited to the range between 0 and $Z_{MaxCount}$. FIG. 2 illustrates a possible signal variation. The same applies to filter 7'.

When the count of the counter of filter 7 reaches the value zero, the output of the filter at point 12 adopts Low. When the count reaches the value $Z_{MaxCount}$, the output of the filter adopts High. Along with the clock frequency $f_{power\ chip}$ used, a filtering time of $$T_{Filter} = \frac{Z_{MaxCount}}{f_{PCU}}$$

$$T_{PCU} = \frac{1}{f_{PCU}},$$

is reached, where $F_{CPU}$ is the clock frequency of the microprocessor. This implementation is used to suppress all interferences, which are shorter than $T_{Filter}$ and detected by the sampling system. The count of the filter is shown in FIG. 2 as a function of the input of the filter.

Figure 3:
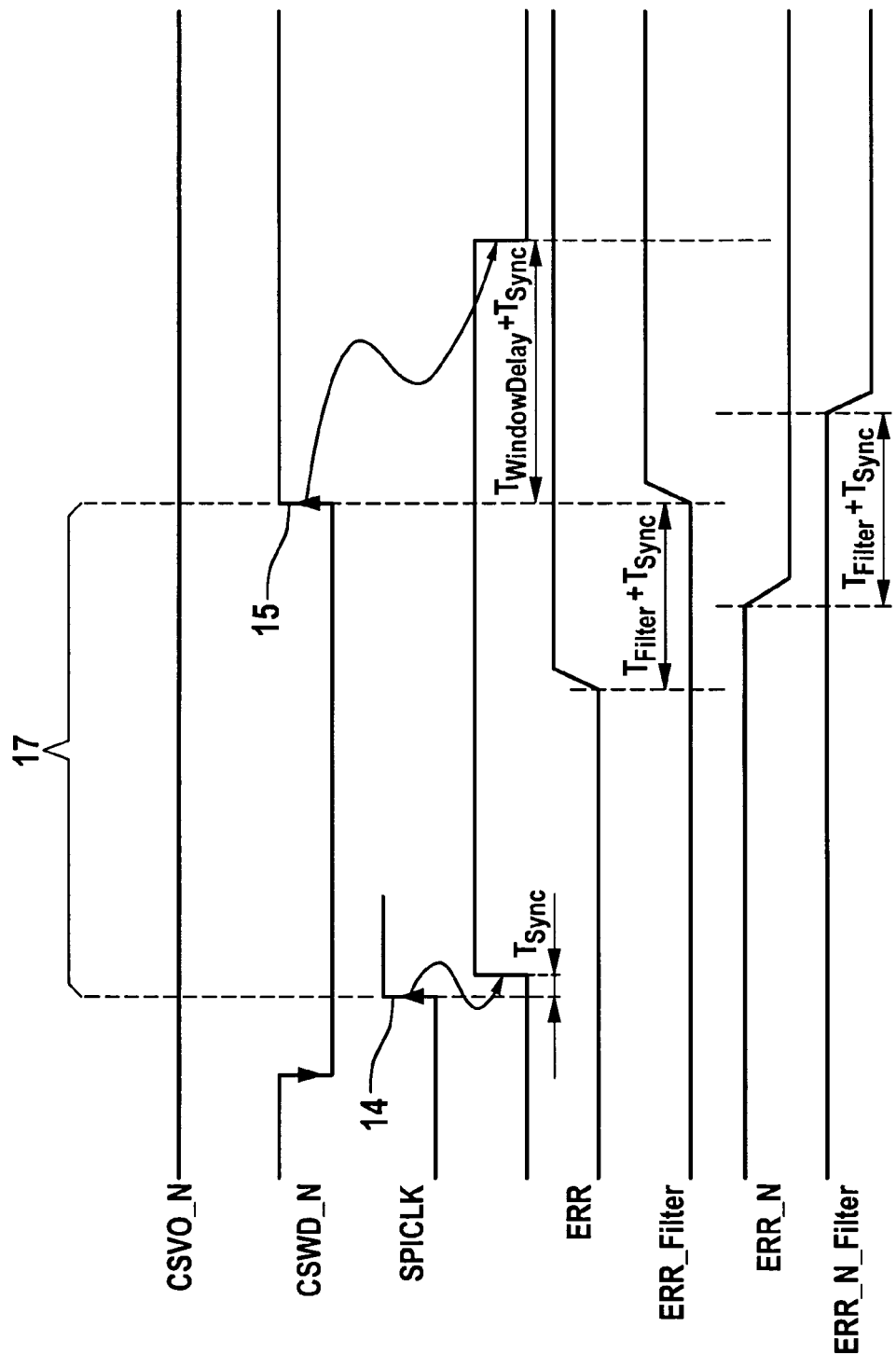
FIG. 3 is a diagram showing the time behavior of the signals (timing diagram).

FIG. 3 represents a timing diagram, which illustrates the logical levels of the existing control lines as a function of time. A possible definition of a watchdog time window in block 50 is now explained by way of this Figure. The watchdog time window in block 'watchdog window' 50 is determined by the processor chip 1, using the SPI-interface 5. Processor chip 1 selects the watchdog transfer by the chip select signal CSVO_N=low and CSWD_N=high.

The watchdog-time window 17 starts after the first leading edge 14 on the clock signal of the SPI-transfer SPICLK. The delay TSync comprises signal running times as well as the synchronization time between the external clock of the SPI-interface and the internal power chip system clock.

The watchdog time window 17 ends per se after the leading edge 15 of CSWD_N. However, it must be safeguarded that the edges of the filtered signals ERR or ERR_N, respectively, are detected still within the active watchdog-time window. Following the point of time of edge 15 is, for this reason, a delay time $T_{WindowDelay}$, in which the expected edge is still processed. The following condition applies then:

$$T_{WindowDelay} > T_{Filter}$$

However, this condition satisfies the requirements only in a fail-free system. If the effect is considered though that interferences on the input signal cause an additional delay, the most robust and less sophisticated system is obtained with $$T_{WindowDelay} \approx 2 \cdot T_{Filter},$$

because the presented filtering delay in the system that failed can never become greater than the double filtering time.

In this respect, the following demands must be placed on the signal delay within the processor chip 1:

Outside the time, during which the error testing routine is running (watchdog transfer), a one-time error event inside a processor chip 1 always leads to an error detection inside the power chip 2. In this case, processor chip 1 is only required to guarantee that the pulse length does not fall under the minimum pulse length $T_{Min}$ on the signals ERR or ERR_N, respectively.

During an error testing routine (watchdog transfer), in which a time window is defined by way of bus 5, it must be guaranteed that, apart from the error being caused by the testing procedure, every additional error is reliably detected by the power chip 2. In this case, processor chip 1 must change one time the levels on the error lines ERR/ERR_N for the first error that occurs. If another error appears in the processor chip 1 during the time $T_{Min}$, this error must be delayed until the expiry of the time $T_{Min}$. Subsequently, processor chip 1 must change the signal levels on ERR/ERR_N again. This is done by the device 6 or 6', respectively ('toggle and delay'). In this case, either the double change in levels during the watchdog time window 17 is detected in power chip 2, or a change of levels occurs outside the time window 17. The power chip 2 detects the additional error in both cases.

A double change in levels at an interval of $T_{Min}$ will thus be sufficient in all cases in order to detect an error in the power chip. Hence, the block 'toggle & delay' 6 or 6', respectively, in addition to the first error that occurs, must transmit only one further error to the power chip, delayed by $T_{Min}$.

The invention claimed is:

1. A Method of improving immunity to interference of an integrated circuit, the method comprising:
   sending a pair of logically complementary error signals from respective first and second independent processor cores to at least one further component; and
   evaluating the error signals in the at least one further component when each of the error signals has maintained its respective logic state for at least a minimum pulse length,
   wherein in the event of a sequence of pulses on at least one of the error signals with a distance between the pulses that is smaller than the minimum pulse length, the time of the sequence of pulses output over a respective one of the error signals is extended with respect to the actual pulse sequence time.

2. A method according to claim 1, wherein the further component is a mixed-signal module.

3. A method according to claim 1 further comprising filtering the error signals.

4. A method according to claim 1, wherein at least one watchdog time window is predetermined in the at least one microprocessor chip or multiple processor µC or in the further component, within which at least one test pulse is generated on the error signals.

5. A method according to claim 4, wherein the watchdog time window has a delay time TWindowDelay, and the time window, in which at least one error signal or error signal pattern is expected, remains open until the expiry of the delay time TWindowDelay.

6. A method according to claim 5, wherein the delay time TWindowDelay is longer than a filter time TFilter of filters processing the error signals.

7. A method according to claim 5, wherein the time window TWindowDelay is set in the further component by way of an interface connected to at least one microprocessor chip or multiple processor µC.

8. A method according to claim 5, wherein a condition TWindowDelay is satisfied in excess of the filter time TFilter.

9. A method according to claim 5, wherein the delay TWindowDelay approximately corresponds to twice the time TFilter.

10. A method according to claim 1 further comprising extending durations of pulses on the error signals.

11. A method according to claim 1, wherein a test of the error signals is performed with the aid of an interface.

12. A method according to claim 1, wherein the error signals are filtered by filters with a defined filter time TFilter.

13. A method according to claim 1, wherein the pulse width TMin is set to a value of at least 30 nanoseconds approximately.

14. An integrated circuit comprising:
   at least a first and second independent processor core;
   at least one additional separate component having separately arranged power elements; and one or more pulse extending devices or signal delaying devices for outputting error pulses one after another through a logically complementary pair of error lines; and
   Wherein in the event of a sequence of pulses on at least one of the error signals with a distance between the pulses that is smaller than the minimum pulse length, the time of the sequence of the pulses output over a respective one of the error signals is extended with respect to the actual pulse sequence time.

15. An integrated circuit according to claim 14 further comprising: one or more filters for filtering the error pulses transferred through the error lines.

16. An integrated circuit comprising:
at least a first and second independent processor core;
at least one additional component having separately arranged power elements, wherein a complementary pair of error signals transferred between the at least one first and second independent processor core and the at least one additional component; and wherein in the event of a sequence of pulses on at least one of the error signals with a distance between the pulses that is smaller than the minimum pulse length, the time of the sequences of pulses output over a respective one of the error signals is extended with respect to the actual pulse sequence time; and
filters for filtering error pulses through associated ones of the error signals.

17. An integrated circuit according to claim 16, wherein each filter is configured as a digital forward/backward counter.

18. An integrated circuit according to claim 16, wherein the chips or components are interconnected by at least one bus and at least one error line.

19. An integrated circuit according to claim 18, wherein the circuit includes hardware test structures, with the aid of which a test of the at least one error line can be performed using an interface.

20. An integrated circuit according to claim 16, wherein the first and second independent processor core or the additional component comprises at least one watchdog window circuit.

21. An integrated circuit according to claim 20, wherein the watchdog window circuit predefines a watchdog time window, and the watchdog time window has a delay time TWindowDelay, and the time window, in which at least one error signal or error signal pattern is expected, remains open until the expiry of the delay time TWindowDelay.

22. An integrated circuit according to claim 20, wherein the delay time TWindowDelay is longer than the filter time TFilter of the filter(s) processing the error signal(s) of the at least one error line.

* * * * *